› Patented Aug. 4, 1953

UNITED STATES PATENT OFFICE 2,647,880

PRODUCTION OF SILICONE LACQUERS

Siegfried Nitzsche, Burghausen, Upper Bavaria, Germany, assignor, by mesne assignments, to Wacker-Chemie G. m. b. H., Munich, Germany No Drawing. Application April 19, 1950, Serial No. 156,948. In Germany May 25, 1949

3 Claims. (Cl. 260—46.5)

This invention relates to the production of silicon lacquers and it has for its object to provide a novel and improved process for this purpose.

A related object of the invention is to provide a simple and economical process for producing silicon lacquers from organosilicon halides.

Other more specific objects and advantages will appear as the nature of the invention is more fully disclosed.

The production of silicone lacquers from organosilicon halides especially from alkylchlorosilanes is difficult because, in the first place, the silicon compounds must be fully hydrolyzed, and, in the second place, too extensive condensation of the intermediate product must be avoided.

I have now discovered a simple and efficient process which fulfills the above requirements. In carrying out my process organosilicon halides e. g. a mixture of 100 parts of methyltrichlorosilane, B. P. 63–65° C. 730 mm., with 15 parts of dimethyldichlorosilane are mixed with a quantity of an alcohol for instance ethylalcohol or methyl alcohol which is not sufficient to effect a complete transformation, or leads to a complete transformation, and then the reaction product is partly saponified with water or aqueous hydrochloric acid, during which the additions are so gauged that the transformation remains incomplete, whereupon the transformation product is taken up with a solvent which is not miscible with water such as toluene and then the transformation is carried to a conclusion with an excess of water.

Example 50 grams of methyltrichlorosilane ($CH_3SiCl_3$) and thereafter 17 grams of dimethyldichlorosilane ($CH_3)_2SiCl_2$ are added dropwise to 38 grams of ethyl alcohol. A partial reaction with the silicon compound occurs with the evolution of hydrogen chloride and cooling. A mixture of 8 cc. of water and 3 cc. of concentrated hydrochloric acid is then slowly added, whereupon hydrolysis sets in immediately. When, after a short time, the formation of streaks occurs, a solvent which is immiscible or slightly miscible with water is added, for example, 100 grams of toluene. The streaks dissolve immediately, and then an excess of water is added and the reaction is thereby brought to an end. The toluene solution is colourless and sometimes slightly turbid owing to occluded water. The solution is then washed with water and the toluene is driven off. The resin may be brought to the requisite degree of polymerisation by heating, advantageously, for example, in the presence of a base such as quinoline. Depending on the properties desired it is heated for a prolonged period at 140–150° C.

The invention claimed is:

1. The process for producing solvent-soluble silicone resins from alkylsilicon halides which comprises reacting ethanol with an alkylsilicon halide containing at least two halogen atoms per silicon atom, in an amount insufficient to effect replacement of all of the halogen atoms of said silicon halide, whereby a part only of said halogen atoms are replaced by ethoxy radicals, then partially hydrolyzing the reaction product with water in the absence of a water immiscible solvent, adding a solvent for the reaction product, which solvent is immiscible with water, and then interacting the reaction product in the resulting solution with water in amount sufficient to completely hydrolyze all remaining halogen atoms and alkoxy radicals and in amount sufficient to form a separate water layer, and separating the water layer from the siloxane solution so produced.

2. The process for producing solvent-soluble silicone resins from alkylsilicon halides which comprises reacting an alcohol selected from the group consisting of methanol and ethanol with an alkylsilicon halide, containing at least two halogen atoms per silicon atom, in an amount insufficient to effect replacement of all of the halogen atoms of said silicon halide, whereby a part only of said halogen atoms are replaced by alkoxy radicals, then partially hydrolyzing the reaction product with water in the absence of a water immiscible solvent, adding a solvent for the reaction product, which solvent is immiscible with water, and then interacting the reaction product in the resulting solution with water in amount sufficient to completely hydrolyze all remaining halogen atoms and alkoxy radicals and in amount sufficient to form a separate water layer, and separating the water layer from the siloxane solution so produced.

3. The process in accordance with claim 2 in which the alkylsilicon halide is a mixture of methyltrichlorosilane and dimethyldichlorosilane.

SIEGFRIED NITZSCHE.

References Cited in the file of this patent

UNITED STATES PATENTS

| Number | Name | Date |
|---|---|---|
| 2,483,209 | Lamoreanx | Sept. 27, 1949 |
| 2,486,162 | Hyde | Oct. 25, 1949 |
| 2,521,673 | Britton et al. | Sept. 12, 1950 |
| 2,556,897 | Bidaud | June 12, 1951 |
| 2,566,364 | Pedlow et al. | Sept. 4, 1951 |

FOREIGN PATENTS

| Number | Country | Date |
|---|---|---|
| 955,712 | France | July 4, 1949 |